Figure 5:
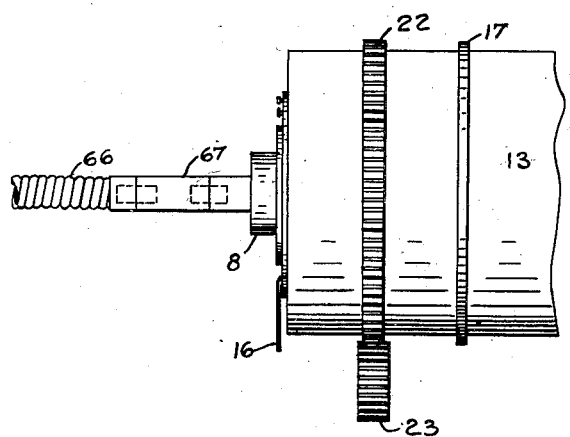

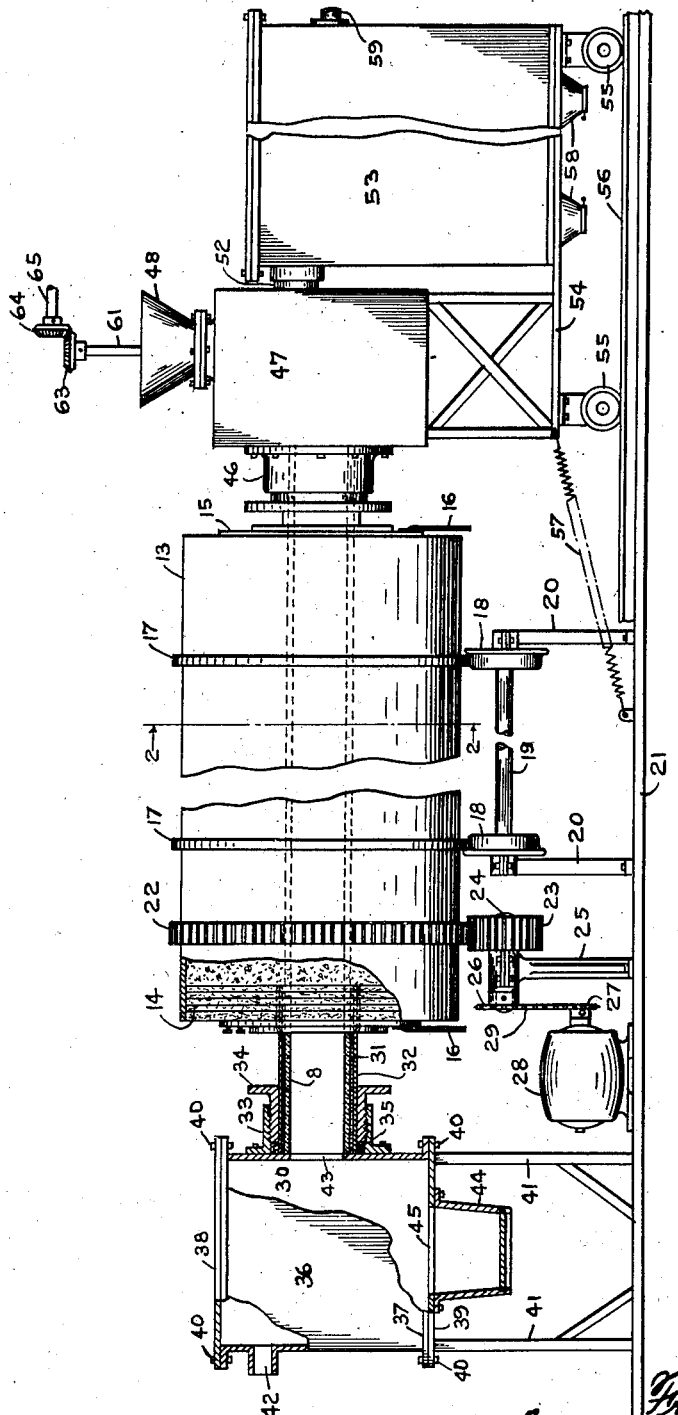

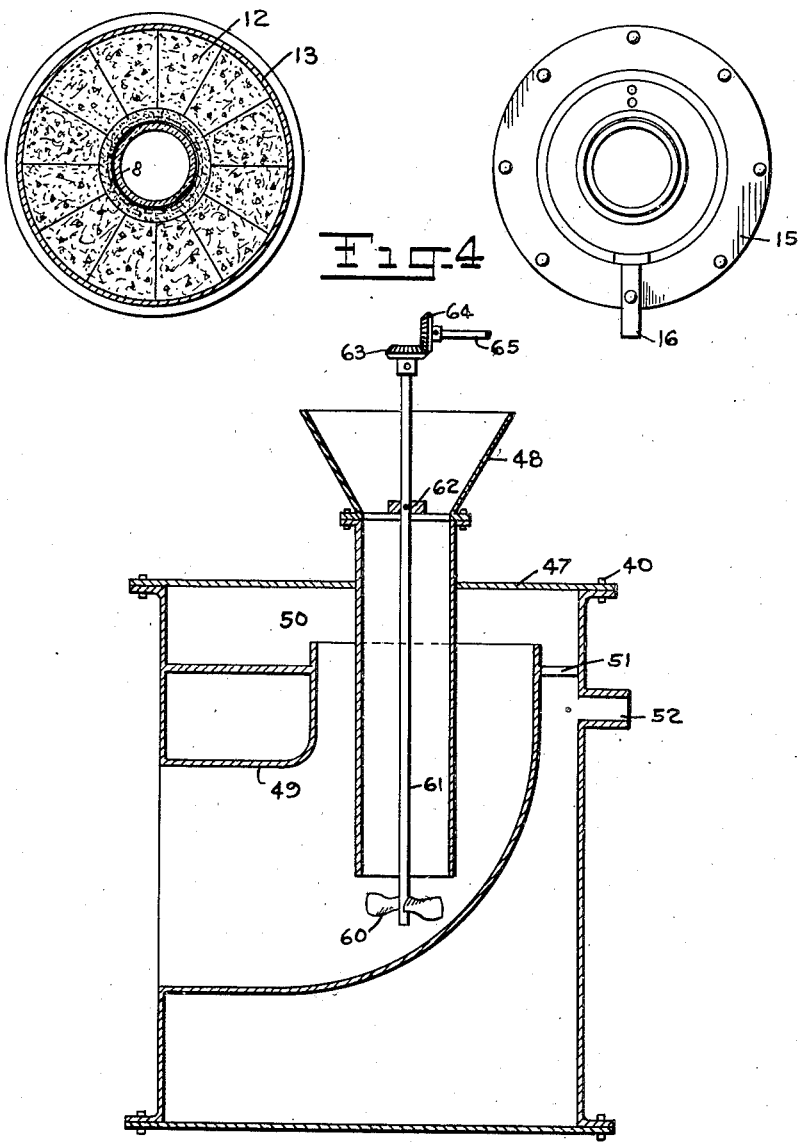

Dec. 8, 1925.                                              1,564,302
                       F. T. WOHLERS
         APPARATUS FOR MAKING ANHYDROUS METALLIC CHLORIDES
                   Filed Dec. 17, 1921      3 Sheets-Sheet 3

Inventor
Frederick T. Wohlers
By his Attorney
Clarence G. Campbell

Patented Dec. 8, 1925.

1,564,302

UNITED STATES PATENT OFFICE.

FREDERICK T. WOHLERS, OF HASBROUCK HEIGHTS, NEW JERSEY, ASSIGNOR TO THE ANHYDROUS METALLIC CHLORIDES CORPORATION, OF DOVER, DELAWARE, A CORPORATION OF DELAWARE.

APPARATUS FOR MAKING ANHYDROUS METALLIC CHLORIDES.

Application filed December 17, 1921. Serial No. 523,016.

*To all whom it may concern:*

Be it known that I, FREDERICK T. WOHLERS, a citizen of the United States, residing at Hasbrouck Heights, in the county of Bergen and State of New Jersey, have invented certain new and useful Improvements in an Apparatus for Making Anhydrous Metallic Chlorides, of which the following is a specification.

My invention relates to an apparatus adapted for the making of anhydrous metallic chlorides, and more particularly to the arrangement and adaptation of the parts, as will be more fully hereinafter pointed out.

Heretofore the construction of an apparatus adapted to withstand the disintegrating effects of the heated gases formed in making anhydrous metallic chlorides has not been successfully accomplished. It has therefore been impossible to carry out the making of anhydrous metallic chlorides for any material length of time or what could be called a continuous length of time because of the disintegration of the materials of which the apparatus was constructed.

The reaction chamber of my device is constructed of a tube of fused silica, and the particular form of fused silicia now available on the market is known by the trade as vitreosil. By constructing my reaction chamber of this material I have been able to construct a device which is adapted to make anhydrous metallic chlorides over a material length of time so that the operation could be called a continuous process.

As my device is able to stand the disintegrating effect of the heated gases involved in the manufacture of anhydrous metallic chlorides, it has been possible to so construct my device that it does not leak, and the danger of escaping gases during the operation has been thereby eliminated so that my device is safe both as to the life and health of the operator, whereas heretofore all efforts to produce metallic chlorides have been hampered by the danger of escaping toxic gases.

The reaction chamber in particular of all former devices has failed to meet the chemical requirements, as the reaction chamber must be constructed of a material which is both inert and impervious to the gases present at the temperatures required during the making of anhydrous metallic chlorides.

The problem of uniform heating in the reaction chamber in the making of anhydrous metallic chlorides has also been a difficult problem which has not been satisfactorily solved heretofore, and my device has made it possible to attain and maintain a substantially uniform temperature in that portion of the reaction chamber where the chemical changes occur.

My device has also solved the problem of uniform feeding of the mixture or compound of the metallic element so that it will always be in excess of the chlorine, thereby insuring a perfect reaction between the chlorine and the metallic element, and also insuring the presence of sufficient quantity of metallic element to keep the chlorine engaged in the reaction process, thus preventing it having chemical freedom, which freedom often causes serious troubles.

My device is also furnished with a mechanical agitator adapted to prevent the formation of crust on the mixture or compound of the metallic element, as the chloride may come in contact therewith, and the uniform feeding of the mixture or compound of the metallic element in condition to be acted upon by the chlorine is thereby assured at all times.

My device is so pitched that there is a continuous drop from the feed box of the solids through the reaction chamber into the chlorine feed chamber. In this way the continuity of the operation is assured, and the waste products will also be collected, and can be removed without interrupting the process, either from the chlorine chamber or from the condensation chamber.

Figure 6:
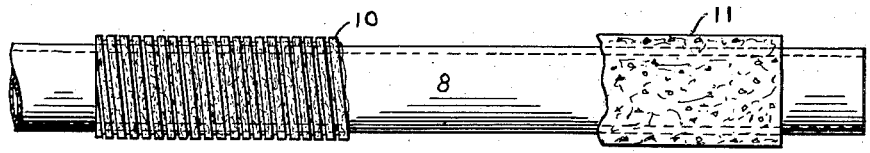
Figure 7:
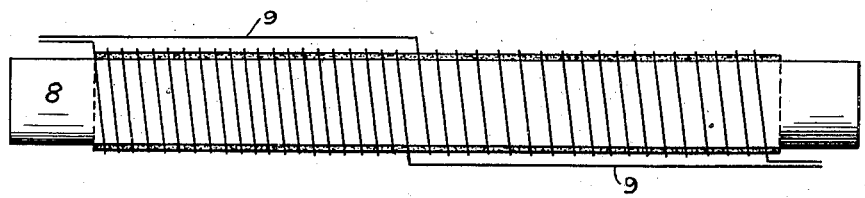

Referring to the drawings, Figure 1 is a perspective of my device, showing certain portions broken in order to shorten the drawing, and with certain portions broken away in order to show the construction; Fig. 2 is a vertical section on the line 2—2 of Fig. 1; Fig 3 is a top plan view of a contact plate; Fig. 4 is a vertical section of the metallic feed box; Fig 5 is an alternative construction showing the connection to the chlorine feed chamber when there are no waste products to be taken care of; Fig. 6 is a detail of the construction of the reaction chamber; and Fig. 7 is a detail of the resistance coil winding on the reaction chamber.

In the drawings 8 is a reaction chamber, cylindrical in shape, which is made of fused silica, such as vitreosil, which is the trade name of a suitable fused silica material which I have found in actual practice will serve my purpose. This reaction chamber should be of substantial length, but not of a very large diameter. A resistance coil 9 is wound around said reaction chamber 8, as shown in Fig. 6, and a suitable fireproofing cement 10 is used to coat the resistance coil 9 so as to hold it securely in place on the reaction chamber 8, and after this has sufficiently set so as to positively fix the resistance coil 9 in its position around the reaction chamber 8 it is then built up by adding further fireproofing cement thereto, as shown at 11 in Fig. 6. Suitable truncated sectors of fireproof brick 12 are then inserted, so as to entirely surround the section 11, into a cylindrical iron tube 13 which has been slipped over said reaction chamber 8, thereby surrounding the sectors 12 and holding them in place so that the entire cylindrical tube 13 can be packed in a similar way with sectors 12 so as to effect an adequate heat insulation to the reaction chamber 8 and the resistance coil 9. Both ends of the cylindrical tube 13 are packed with a suitable number of asbestos circular plates 14, having a circular opening at the center adapted to fit over the reaction chamber 8, and to each end is adapted to be rigidly secured brass heads 15 having circular openings at their center adapted to fit over the reaction chamber 8, and to which heads 15 are secured the terminals of the resistance coil 9. Brushes 16 connected to a source of power, not shown herein, are also mounted so as to make a constant brush contact with said plates 15 as they rotate. Trunnions 17 are secured to the outside of the cylinder 13 so as to make a rolling contact with wheels 18, which are mounted on a shaft 19 which is mounted at each end so as to rotate freely in uprights 20 which are rigidly secured to a base member 21, thereby effecting the support of the cylinder 13 and the reaction chamber 8 carried therein.

A driven gear 22 is also rigidly secured to the cylinder 13 so as to engage a driving gear 23, which is mounted on a shaft 24, which shaft is so mounted in the head of a bracket 25 as to rotate freely therein, said bracket 25 being rigidly secured to the base member 21. A sprocket 26 is rigidly secured to the shaft 24 at the opposite end from the gear 23, and a sprocket 27 is mounted on a motor 28 so that it is driven thereby, said motor 28 being rigidly secured to the base member 21. A chain 29 is mounted over the sprockets 26 and 27 so that as sprocket 27 is driven by the motor 28 the chain 29 is thereby driven, which in turn drives the sprocket 26. The rotation of sprocket 26 also rotates the shaft 24, to which it is rigidly mounted, and the gear 23 which is rigidly secured to the shaft 24 rotates therewith. The rotation of gear 23, which is in mesh with gear 22, drives said gear 23, thereby rotating the cylinder 13 and the reaction chamber 8 and other parts mounted in said cylinder 13.

The reaction chamber 8 projects beyond the plates 15 a material distance at each end, and at the lower end is connected to a chlorine chamber 30, having an asbestos coating 31 over said projection and a suitable metal cylinder 32 over said asbestos coating 31, both 31 and 32 extending into the cylinder 13 as far as the asbestos plates so extend. The reaction chamber 8 is connected to the chlorine chamber 30 by means of a stuffing box joint 33 of usual construction, which is rigidly secured to the chlorine chamber 30 and which has a screw member 34 adapted to be screwed down in the usual manner on a packing 35 so as to effect a flexible non-leaking joint. The manner of connection of the reaction chamber 8 to the chlorine chamber 30 enables any variation made by the reaction chamber 8 in rotating from its true or fixed position horizontally to be taken up by the members 31 and 32 against the asbestos plates 14 at one end of the connection, and the packing 35 at the other end, so as to prevent any possibility of breaking the reaction chamber tube 8.

The chamber 30 is an air-tight chamber having a cylindrical body member 36 with upturned edges 37 rigidly clamped to top member 38 and bottom member 39 by means of suitable bolts 40. The chlorine chamber 30 is rigidly mounted on supports 41 which are rigidly secured to the base member 21. The chlorine chamber 30 has an inlet opening 42 from the source of chlorine supply, and an outlet 43 into the reaction chamber 8. It also has a waste material container 44 rigidly secured to the bottom 39, and the bottom 39 has an opening 45 permitting all waste material to fall into 44 under normal conditions, but said opening 45 is controlled by a slide which can be closed so that the bottom of the container 44 may be opened in order to empty 44 without interfering with the contents of the container 30.

The end of the reaction chamber 8 projects from the cylinder 13 at the opposite end from the chlorine chamber 30 a suitable distance so as to extend into a stuffing box connection 46, which extension and connection is the same as the connection to 30 in construction, and 46 is rigidly secured to a feed chamber 47 for the solids. Said feed chamber 47 has a funnel element 48 made integral therewith, and said funnel 48 projects into a larger inner feed elbow 49, which is made integral with said chamber 47, so that vapors coming into 49 may pass up into the head 50 of the chamber 47 and may thence pass out through opening 51 and outlet 52 into a suitable condensing chamber 53. The feed chamber 47 is rigidly mounted on a car 54 which has two pairs of wheels 55 mounted thereon in the usual manner so as to run on a pair of tracks 56. The condensing chamber 53 is also rigidly mounted on said car 54, and a spiral spring 57 is connected to said car at one end and to the base member 21 at the opposite end, so that it is always under tension and drawing the car 54 toward the reaction chamber 8, thereby effecting a close contact with the end of the reaction chamber 8 which projects to the solid feed chamber 47 so that it is held in close contact therein, together with the stuffing box connection 46.

The condensing chamber 53 has waste collectors 58 at the bottom which are also adapted to be opened to remove the waste in a similar manner to the waste container 44 of the chlorine chamber 30 so as not to interfere with the carrying on of the process. The condensing chamber 53 also has an outlet 59 adapted to be used for drawing off the anhydrous metallic chloride. The outer bodies of both the solid feed chamber 47 and the condensing chamber 53 are constructed in the same manner as the chlorine chamber 30.

A suitable agitator 60 is mounted on a shaft at 62 in the funnel 48, and a shaft 61 has a crown gear 63 rigidly secured to its upper end which meshes with the crown gear 64, which is rigidly secured to a shaft 65 which is driven by some suitable power, not shown herein.

The operation of my device is as follows: Suitable means, not shown herein, will be used for feeding the solid element into the funnel 48 so that said funnel will be kept filled with said solid a substantial distance up from the bottom, thereby building up a pile of the solid element in the elbow 49 so that as the reaction chamber 8 is set in rotation by means of the motor 28 which transfers its power through the sprocket 27, chain 29, sprocket 26, shaft 24, gear 23 and gear 22, the solid element, because of the pitch of the device toward the chlorine chamber end of the apparatus, will travel into and down through the reaction chamber 8, which has been previously brought to the required temperature by means of the current being turned on through the brushes 16, so that as the chlorine is also allowed to enter from the chlorine chamber 30 in the desired amount the reaction desired will be effected. As the reaction chamber 8 is rotated the solid element is thereby tumbled therein so that the chlorine has the opportunity to contact with all parts of the solid element, and both are subject to substantially the same temperature throughout the travel in the reaction zone of chamber 8 because of such tumbling and of the opportunity of all of the chlorine and all of the solid element to contact within the interior of the reaction chamber, so that the reaction will be uniform and complete. The vapors from the reaction will pass on into the elbow 49 and into the head 50 of the feed chamber 47, thence out through the passages 51 and 52 into the condensing chamber 53 where any waste material carried with the said vapors will be deposited and taken out by means of the waste collectors 58, and the resulting product will then be drawn off by means of the outlet 59 in the usual well-known manner. The heavier waste in the reaction chamber 8, which is not carried off with the vapor as described, will continue, because of the rotation and the pitch of the chamber 8 to pass on into the chlorine chamber 30, where it will be collected in the waste collector 44 where it can be removed without interfering with the process. In carrying out this operation it is necessary that the heat be controlled so that a substantially uniform temperature, such as required for the reaction, is attained and maintained, and the flow of the chlorine must also be controlled so that it is not substantially or for any substantial period in excess of the amount required for formation of the metallic chlorides and must also be under regulated control. During this operation the shaft 65 driven by a power not shown herein through the crown gears 64 and 63 will rotate the shaft 61 and the agitator 60, so that any coating which may be formed on the solid because of the contact therewith of the chloride will be constantly broken up so that the solid will always feed continuously and uniformly.

An alternative form of connection to the chlorine chamber is shown in Fig. 5, in which a flexible pipe 66 leading from the chlorine chamber is connected directly to the reaction chambers 8 and 67. This alternative form is adapted for use where there is no material quantity of waste from the solids used, except such as will be taken care of in the condensation chamber as described.

If by any reason due to temperature of the solids fed or other causes the temperature of the evolved gases drops to the point of condensation, then the solid feed chamber may be heated by any convenient way to the temperature which will insure the passage of these gases to the regular condensation chamber.

I claim:

1. In an apparatus for making anhydrous metallic chlorides, the combination of a rotary uniformly heated fused silica reaction chamber, means for feeding the mixture or compound carrying the metallic element into said chamber in a uniform manner, means for regulating the feeding of chlorine into said chamber in an amount sufficient to combine with elements present in the solid feed which are capable of forming metallic chlorides at the temperature maintained and means for condensing the vapors of the reaction.

2. In an apparatus for making anhydrous metallic chlorides, the combination of a rotary uniformly heated fused silica reaction chamber, means for feeding the mixture or compound carrying the metallic element into said chamber in a uniform manner, means for regulating the feeding of chlorine into said chamber in an amount sufficient to combine with elements present in the solid feed which are capable of forming metallic chlorides at the temperature maintained, and means for condensing the product of the reaction.

3. In an apparatus for making anhydrous metallic chlorides, the combination of a rotary uniformly heated fused silica reaction chamber, means for feeding the mixture or compound carrying the metallic element into said chamber in a uniform manner, with means for agitating said mixture or compound as it is fed, means for regulating the feeding of chlorine into said chamber in an amount sufficient to combine with elements present in the solid feed which are capable of forming metallic chlorides at the temperature maintained, and means for condensing the vapors of the reaction.

4. In an apparatus for making anhydrous metallic chlorides, the combination of a rotary uniformly heated fused silica reaction chamber adapted to maintain a substantially uniform temperature internally, means for feeding the mixture or compound carrying the metallic element in said chamber in a uniform manner, means for regulating the feeding of chlorine into said chamber in an amount sufficient to combine with elements present in the solid feed which are capable of forming metallic chlorides at the temperature maintained, and means for condensing the vapors of the reaction.

5. In an apparatus for making anhydrous metallic chlorides, the combination of a rotary uniformly heated fused silica reaction chamber, means for feeding the carbon and the mixture or compound carrying the metallic element into said chamber in a uniform manner, means for regulating the feeding of chlorine into said chamber in an amount sufficient to combine with elements present in the solid feed, which are capable of forming metallic chlorides at the temperature maintained and means for condensing the vapors of the reaction.

6. In an apparatus for making anhydrous metallic chlorides, the combination of a rotary fused silica reaction chamber externally heated so as to maintain a substantially uniform temperature internally, means for feeding the mixture or compound carrying the metallic element into said chamber, means for regulating the feeding of chlorine into said chamber in an amount sufficient to combine with elements present in the solid feed which are capable of forming metallic chlorides at the temperature maintained, and means for condensing the vapors of the reaction.

7. In an apparatus for making anhydrous metallic chlorides, the combination of a rotary fused silica reaction chamber externally heated so as to maintain a substantially uniform temperature internally, means for feeding the mixture or compound carrying the metallic element into said chamber in a uniform manner, means for agitating said mixture or compound as it is fed, means for feeding chlorine into said chamber in an amount sufficient to combine with elements present in the solid feed which are capable of forming metallic chlorides at the temperature maintained, and means for condensing the vapors of the reaction.

8. In an apparatus for making anhydrous metallic chlorides, the combination of a rotary fused silica reaction chamber externally heated so as to maintain a substantially uniform temperature internally, means for feeding the carbon and the mixture or compound carrying the metallic element into said chamber in a uniform manner, means for feeding chlorine into said chamber in an amount sufficient to combine with elements present in the solid feed which are capable of forming metallic chlorides at the temperature maintained, and means for condensing the vapors of the reaction.

9. In an apparatus for making anhydrous metallic chlorides, the combination of a cylindrical fused silica reaction chamber, a resistance coil wound around the outside of same, means for heating said coil, a coating of fireproof cement and bricks over said coil, a metal casing over said bricks, means for rotating said reaction chamber, a chlorine feed chamber connected to said reaction chamber at one end, a solid feed chamber connected to the opposite end of said reaction chamber, and connected to said latter feed chamber a condensing chamber which is connected to the reaction chamber through a passageway in the feed chamber for solids.

10. In an apparatus for making anhydrous metallic chlorides, the combination of a cylindrical fused silica reaction chamber, a resistance coil wound around the outside of same, means for heating said coil, a coating of fireproof cement and fireproof bricks over said coil, a metal casing over said bricks, means for rotating said reaction chamber, a chlorine feed chamber connected by a stuffing box to said reaction chamber at one end, a feed chamber for solids connected by a stuffing box to the opposite end of said reaction chamber, and connected to said latter feed chamber a condensing chamber which is connected to the reaction chamber through a passageway in the feed chamber for solids.

11. In an apparatus for making anhydrous metallic chlorides, the combination of a cylindrical fused silica reaction chamber, a resistance coil wound around the outside of same, means for heating said coil, a coating of fireproof cement and fireproof bricks over said coil, a metal casing over said bricks, means for rotating said reaction chamber, a chlorine feed chamber connected to said reaction chamber at one end, a feed chamber for solids connected to the opposite end of said reaction chamber, and connected to said latter feed chamber a condensing chamber which is connected to the reaction chamber through a passageway in the metallic element feed chamber, and means for collecting and removing the waste products without interrupting the operation of the apparatus.

12. In an apparatus for making anhydrous metallic chlorides, the combination of a cylindrical fused silica reaction chamber, a resistance coil wound around the outside of same, means for heating said coil, a coating of fireproof cement and fireproof bricks over said coil, a metal casing over said bricks, means for rotating said reaction chamber, a chlorine feed chamber connected by a stuffing box to said reaction chamber at one end, a solid feed chamber connected by a stuffing box to the opposite end of said reaction chamber, and connected to said latter feed chamber a condensing chamber which is connected to the reaction chamber through a passageway in the feed chamber for solids, and means for collecting and removing the waste products without interrupting the operation of the apparatus.

13. In an apparatus for making anhydrous metallic chlorides, the combination of a cylindrical fused silica reaction chamber, a resistance coil wound around the outside of same, means for heating said coil, a coating of fireproof cement and fireproof bricks over said coil, a metal casing over said bricks, means for rotating said reaction chamber, a chlorine feed chamber connected to said reaction chamber at one end, a feed chamber for solids, and connected to said latter feed chamber a condensing chamber which is connected to the reaction chamber through a passageway in the feed chamber for solids, and means for agitating the solid feed.

14. In an apparatus for making anhydrous metallic chlorides, the combination of a cylindrical fused silica reaction chamber, a resistance coil wound around the outside of same, means for heating said coil, a coating of fireproof cement and fireproof bricks over said coil, a metal casing over said bricks, means for rotating said reaction chamber, a chlorine feed chamber connected by a stuffing box to said reaction chamber at one end, a feed chamber for solids connected by a stuffing box to the opposite end of said reaction chamber, and connected to said latter feed chamber, a condensing chamber which is connected to the reaction chamber through a passageway in the feed chamber for solids, and means for agitating the solids in the feed chamber for solids.

15. In an apparatus for making anhydrous metallic chlorides, the combination of a cylindrical fused silica reaction chamber, a resistance coil wound around the outside of same, means for heating said coil, a coating of fireproof cement and fireproof bricks over said coil, a metal casing over said bricks, means for rotating said reaction chamber, a chlorine feed chamber connected to said reaction chamber at one end, a feed chamber for solids connected to the opposite end of said reaction chamber, and connected to said latter feed chamber a condensing chamber which is connected to the reaction chamber through a passageway in the feed chamber for solids, and means for collecting and removing the waste products without interrupting the operation of the apparatus, and means for agitating the solids in the feed chamber for solids.

16. In an apparatus for making anhydrous metallic chlorides, the combination of a cylindrical fused silica reaction chamber, a resistance coil wound around the outside of same, means for heating said coil, a coating of fireproof cement and fireproof bricks over said coil, a metal casing over said bricks, means for rotating said reaction chamber, a chlorine feed chamber connected by a non-leaking means to said reaction chamber at one end, a feed chamber for solids connected by a non-leaking means to the opposite end of said reaction chamber, and connected to said latter feed chamber a condensing chamber which is connected to the reaction chamber through a passageway in the feed chamber for solids, means for collecting and removing the waste products without interrupting the operation of the apparatus, and means for agitating the solids in the feed chamber for solids.

17. In an apparatus for making anhydrous metallic chlorides, the combination of a cylindrical fused silica reaction chamber, a resistance coil wound around the outside of same, means for heating said coil, a coating of fireproof cement and fireproof bricks over said coil, a metal casing over said bricks, means for rotating said reaction chamber consisting of a driving gear which engages a driven gear mounted around the metal casing, a chlorine feed chamber connected to said reaction chamber at one end, a feed chamber for solids connected to the opposite end of said reaction chamber and connected to said latter feed chamber, a condensing chamber which is connected to the reaction chamber through a passageway in the feed chamber for solids.

18. In an apparatus for making anhydrous metallic chlorides, the combination of a cylindrical fused silica reaction chamber, a resistance coil wound around the outside of same, means for heating said coil, a coating of fireproof material over said coil, a metal casing over said material, means for rotating said reaction chamber consisting of a motor connected to a driving gear which engages a driven gear mounted around the metal casing, a chlorine feed chamber connected by a stuffing box to said reaction chamber at one end. a feed chamber for solids connected by a stuffing box to the opposite end of said reaction chamber and connected to said latter feed chamber a condensing chamber which is connected to the reaction chamber through a passageway in the feed chamber for solids.

19. In a device for making anhydrous aluminum chloride, the combination of means for feeding the solids uniformly so that the feed funnel is always full at the base, means for agitating said solids at the base of said funnel. a rotating reaction chamber of fused silica, means for feeding chlorine into said reaction chamber in an amount sufficient to combine with elements present in the solid feed which are capable of forming metallic chlorides at the temperature maintained, means for collecting and condensing the vapor from the reaction chamber, and means for collecting and removing waste material without interrupting the operation.

20. In a device adapted for making anhydrous aluminum chloride, the combination of means for feeding the mixture or compound carrying the aluminum uniformly so that the feed funnel is always full at the base, means for agitating said solids at the base of said funnel, a rotating reaction chamber of fused silica, means for feeding chlorine into said reaction chamber in an amount sufficient to combine with elements present in the solid feed which are capable of forming metallic chlorides at the temperature maintained, means for collecting and condensing the vapors from the reaction chamber, and means for collecting and removing waste material without interrupting the operation, all mounted so that there is a drop in pitch from the feed chamber through the reaction chamber and to the chlorine chamber.

21. In an apparatus for making anhydrous metallic chlorides, the combination of a rotary uniformly heated fused silica reaction chamber, means for feeding the mixture or compound carrying the metallic element into said chamber in a uniform manner, means for regulating the feeding of chlorine into said chamber in an amount sufficient to combine with elements present in the solid feed which are capable of forming metallic chlorides at the temperature maintained, means for effecting gas-tight connections at both ends of said reaction chamber adapted to prevent the breakage of said ends due to variation from the true horizontal position of said chamber while rotating, and means for condensing the product of the reaction.

22. In an apparatus for making anhydrous metallic chlorides, the combination of a rotary uniformly heated reaction chamber constructed of a material which is inert and impervious to the gases present at the required temperatures, means for feeding the mixture or compound carrying the metallic element into said chamber in a uniform manner, means for regulating the feeding of chlorine into said chamber in an amount sufficient to combine with elements present in the solid feed which are capable of forming metallic chlorides at the temperatures maintained, and means for condensing the vapors of the reaction.

23. In an apparatus for making anhydrous metallic chlorides, the combination of a rotary uniformly heated reaction chamber constructed of a material which is inert and impervious to the gases present at the required temperatures, means for feeding the carbon and the mixture or compound carrying the metallic element into said chamber in a uniform manner, means for regulating the feeding of chlorine into said chamber in an amount sufficient to combine with elements present in the solid feed which are capable of forming metallic chlorides at the temperature maintained, and means for condensing the vapors of the reaction.

24. In an apparatus for making anhydrous metallic chlorides, the combination of a cylindrical reaction chamber constructed of a material which is inert and impervious to the gases present at the required temperatures, a resistance coil wound around the outside of same, means for heating said coil, a coating of fireproof cement and fireproof bricks over said coil, a metal casing over said bricks, means for rotating said reaction chamber, a chlorine feed chamber connected to said reaction chamber at one end, a feed chamber for solids connected to the opposite end of said reaction chamber, and connected to said latter feed chamber a condensing chamber which is connected to the reaction chamber through a passageway in the metallic element feed chamber, and means for collecting and removing the waste products without interrupting the operation of the apparatus.

25. In an apparatus for making anhydrous metallic chlorides, the combination of a cylindrical reaction chamber constructed of a material which is inert and impervious to the gases present at the required temperatures, a resistance coil wound around the outside of same, means for heating said coil, a coating of fireproof cement and fireproof bricks over said coil, a metal casing over said bricks, means for rotating said reaction chamber, a chlorine feed chamber connected by a non-leaking means to said reaction chamber at one end, a feed chamber for solids connected by a non-leaking means to the opposite end of said reaction chamber, and connected to said latter feed chamber a condensing chamber which is connected to the reaction chamber through a passageway in the feed chamber for solids, means for collecting and removing the waste products without interrupting the operation of the apparatus, and means for agitating the solids in the feed chamber for solids.

In testimony whereof I affix my signature.

FREDERICK T. WOHLERS.